(12) United States Patent
Zapata et al.

(10) Patent No.: US 10,027,120 B1
(45) Date of Patent: Jul. 17, 2018

(54) SYSTEM AND METHOD FOR HIGH EFFICIENCY POWER QUALITY CORRECTION

(71) Applicant: Edge Electrons Limited, Hong Kong (HK)

(72) Inventors: Jian Carlo Decena Zapata, Pampanga (PH); Efren II Santos Cruzat, Makati (PH); Neal George Stewart, Makati (PH); Gordon Currie, Makati (PH); Wing Ling Cheng, Hong Kong (HK)

(73) Assignee: EDGE ELECTRONS LIMITED, Hong Kong (HK)

( * ) Notice: Subject to any disclaimer, the term of this patent is extended or adjusted under 35 U.S.C. 154(b) by 0 days.

(21) Appl. No.: 15/831,383

(22) Filed: Dec. 4, 2017

Related U.S. Application Data

(63) Continuation-in-part of application No. 15/555,079, filed on Sep. 1, 2017.

(51) Int. Cl.
*H02J 3/18* (2006.01)
*H02M 1/42* (2007.01)
*H02J 3/01* (2006.01)
*H02M 1/32* (2007.01)

(52) U.S. Cl.
CPC ............ *H02J 3/1828* (2013.01); *H02J 3/01* (2013.01); *H02J 3/1821* (2013.01); *H02M 1/32* (2013.01); *H02M 1/4266* (2013.01)

(58) Field of Classification Search
CPC .. H02M 1/32; H02J 3/01; H02J 3/1821; H02J 3/1828
See application file for complete search history.

(56) References Cited

U.S. PATENT DOCUMENTS

| | | | | |
|---|---|---|---|---|
| 5,399,955 A | * | 3/1995 | Glaser | G05F 1/70 323/208 |
| 5,631,545 A | * | 5/1997 | Norman | H02J 3/1864 323/205 |
| 9,490,778 B1 | * | 11/2016 | Ho | H03K 3/0322 |
| 2006/0250117 A1 | * | 11/2006 | Rayburn | G05F 1/70 323/209 |
| 2008/0106241 A1 | * | 5/2008 | Deaver | H02J 3/1828 323/209 |
| 2011/0285331 A1 | * | 11/2011 | Sugie | H03L 7/06 318/139 |
| 2013/0204554 A1 | * | 8/2013 | Tuckey | G01R 19/2513 702/58 |
| 2014/0306543 A1 | * | 10/2014 | Garrity | H02M 7/44 307/82 |

(Continued)

*Primary Examiner* — Jeffrey Gblende
*Assistant Examiner* — David A. Singh
(74) *Attorney, Agent, or Firm* — Idea Intellectual Limited; Margaret A. Burke; Sam T. Yip

(57) ABSTRACT

A high-efficiency system for conducting power factor (PF) and harmonics correction in an electrical network, comprising a controller; a digital PFC capacitor array comprising two or more passive PFC capacitors, providing fine steps increments in the PF correction; and linear PFC capacitor arrays, providing coarse steps increments in the PF correction. The PF correction in coarse steps increments and fine steps increments allow a total or near total PF correction without overcompensation. Optionally, the system further comprises a lower power active power filter (APF) configured to only target and eliminate or minimize harmonics in the electrical network.

18 Claims, 5 Drawing Sheets

(56) References Cited

U.S. PATENT DOCUMENTS

| | | | | |
|---|---|---|---|---|
| 2015/0054668 A1* | 2/2015 | van der Goes | ....... | H03M 1/403 341/172 |
| 2016/0043635 A1* | 2/2016 | Stewart | ................ | G01R 21/003 323/208 |
| 2017/0194688 A1* | 7/2017 | Sharma | ..................... | H01P 5/16 |

* cited by examiner

FIG. 5A – Prior Art –

SYSTEM AND METHOD FOR HIGH EFFICIENCY POWER QUALITY CORRECTION

CROSS-REFERENCE TO RELATED PATENTS AND PATENT APPLICATIONS

This application is a continuation-in-part (CIP) application of U.S. patent application Ser. No. 15/555,079 filed Sep. 1, 2017; the disclosure of which is incorporated herein by reference in their entirety. This application is related to U.S. Pat. No. 9,712,048 issued Jul. 18, 2017; the disclosure of which are incorporated herein by reference in their entirety.

FIELD OF THE INVENTION

The present invention relates generally to electrical power generation and distribution. Particularly, the present invention relates to electrical power quality compensation methods and systems.

BACKGROUND

Power quality, and in particular the subject of this disclosure, power factor (PF) and harmonics, are increasing problems in the mains of electrical power distribution systems having added the many different types of modern electrical appliances and electronic devices. In an alternating current (AC) mains, there is an alternating positive and negative voltage sine wave, at either the fundamental frequency of 50 or 60 Hz, depending on the country. In an AC system, the AC current is also in a sine wave, but can be shifted in a phase angle relative to the voltage sine wave at the fundamental frequency. This phase shift at the fundamental frequency is measured as power factor (PF) or reactive power KVAR, and this phase shift is a major contributor in power quality degradation. In addition to degrading the power quality, the voltage or current can be distorted away from the desired voltage and current sine waves, creating higher order voltage and current frequencies that are harmonic multiples of the fundamental frequency (e.g. 50 or 60 Hz). These higher order frequencies due to voltage and current sine wave distortions, called voltage harmonics and current harmonics respectively, are well known in the industry to have caused serious power quality problems with electrical devices (e.g. motors and transformer heating elements) connected to the electrical power distribution network, and can shorten the lifespan of such electrical devices with destructive effects.

SUMMARY OF THE INVENTION

It is an objective of the present invention to provide a method and system for correcting PF or KVAR without overcompensation. It is also an objective of the present invention to provide such method and system that is lower in power loss, heat dissipation, and cost, and higher in efficiency than currently available comparable methods and systems. It is still another objective of the present invention to provide such method and system that can accommodate the parallel use of grid audio or audio frequency load control (AFLC) signaling in the electrical network.

In accordance to one embodiment of the present invention, provided is a system for conducting power factor (PF) and harmonics correction in an electrical network, comprising: a controller configured: to receive the electrical network real-time measurement data including power factor, line voltage, line frequency, reactive power, and sign of reactive power; to determine a compensation capacitance required to correct the PF; and to generate one or more driving signals for switching ON and OFF one or more PFC capacitors according to the determined compensation capacitance required. The system further comprises a digital PFC capacitor array comprising two or more passive PFC capacitors and configured to receive the driving signals for switching ON and OFF any one of its passive PFC capacitors, providing fine steps increments in the PF correction; wherein the digital PFC capacitor array passive PFC capacitors are of different capacitance values and are arranged in largest to smallest or smallest to largest order. The system further comprises one or more linear PFC capacitor arrays, each comprising one or more passive PFC capacitors and configured to receive the driving signals for switching ON and OFF its passive PFC capacitors, providing coarse steps increments in the PF correction; wherein each of the linear PFC capacitor arrays has a capacitance that is same or larger than the largest digital PFC capacitor array passive PFC capacitor's capacitance. The system can be implemented as an expandable PFC capacitor rack, with each of the digital PFC capacitor array and linear PFC capacitor arrays being an installable and removable module in the PFC capacitor rack.

In accordance to another embodiment of the present invention, the system for conducting PF and harmonics correction further comprises an active power filter (APF). The APF is a lower power APF configured to only target and eliminate or minimize the higher frequency harmonics in the electrical network; wherein the digital PFC capacitor array and the linear PFC capacitor arrays are configured to correct the fundamental frequency PF.

In accordance to another aspect of the present invention, provided is a method of timed switching ON and OFF the PFC capacitors based on zero-voltage detections across the switching elements. Such method protects the switching elements from very high destructive surge currents when fast-switching the PF capacitors in and out of the high AC voltage line of the electrical network. In an alternative embodiment, voltage bleeders are employed in the fast-switching of PF capacitors to protect the switching elements from very high destructive surge currents.

In accordance to another aspect of the present invention, provided is a method of switching ON and OFF the PFC capacitors to allow audio or audio frequency load control (AFLC) signaling in the electrical network. In accordance to yet another aspect of the present invention, the APF in the system for conducting PF and harmonics correction is configurable to allow an audio or AFLC voltage signal at a specified frequency to bypass the APF and not be eliminated or minimized as an undesirable harmonic.

BRIEF DESCRIPTION OF THE DRAWINGS

Embodiments of the invention are described in more detail hereinafter with reference to the drawings, in which:

FIG. 5A depicts a block diagram illustrating a legacy active power filter (APF) in the traditional application of correcting not only the PF at the grid fundamental frequency, but also the higher frequency harmonics;

DETAILED DESCRIPTION OF THE INVENTION

Figure 1:
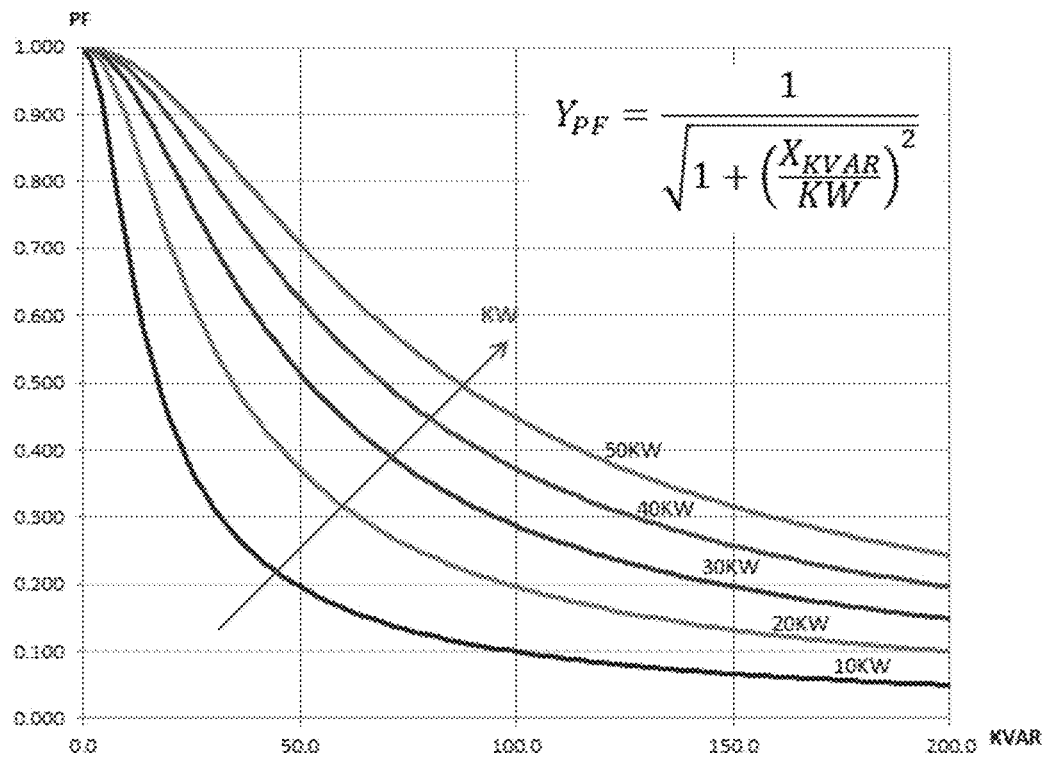
FIG. 1 shows a graph illustrating the non-linear relationship between power factor (PF) and KVAR per the PF as a function of KVAR with KW as a range of fixed constants.

In the following description, methods, systems, and apparatuses for correcting power factor (PF) and harmonics in an AC electrical network and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

It is well known that as inductive loads are connected to an AC electrical network, the current begins to lag the voltage waveform due the reactance of the inductive load. On the other hand, when capacitance loads are connected to the electrical network, the current begins to lead the voltage waveform due to the reactance of the capacitive load. The phase difference between the voltage and the current for both inductive or capacitive loads is related to by PF, and is measured by the lagging or leading reactive power KVAR. When the voltage and current are correctly aligned in phase, the PF of the electrical network equals to one (PF=1.0) and KVAR=0. As inductive loads are added, the PF falls below 1.0 as the current begins to lag the voltage waveform, and the lagging KVAR increases; and when capacitive loads are added, likewise, the PF falls below 1.0 as the current begins to lead the voltage waveform, and the leading KVAR increases. A reduction in PF, or increase in lagging or leading KVAR can cause serious consequences in terms of electricity cost and penalties, which may be levied. And since compensative reactive power, lagging or leading, must be generated, transmitted, and supplied to the load, KVAR adds to the costs of electrical power generation and transmission. For example, power factors below a threshold and/or reactive power KVAR above a threshold are billed to end consumers in the discretion of the electrical power supplier and/or electrical power distribution network operator. In some cases, even at PF<0.9, heavy levies and additional charges are passed onto the end consumers.

In general, most types of loads across electrical power distribution networks are inductive, which cause lagging PF or lagging reactive power KVAR. Thus, it is a common practice to add passive power quality compensation devices that rely on switching ON blocks of linear PFC capacitors of various values across the electrical network phases that compensate for the inductive loads, correct the PF back to closer to 1.0, eliminate or minimize the lagging reactive power KVAR, and restore the power quality. But the problem with these conventional linear passive power quality compensation devices is that they are prone to overcompensation.

In general, these conventional linear passive power quality compensation devices operate as follows: first, the PF or the desired amount of leading reactive power KVAR is measured; second, the amount of the capacitance required to minimize or eliminate the lagging reactive power KVAR is calculated by various means, e.g. deriving from a look-up table with minimum and maximum limits of capacitance to be selected; then finally the calculated amount of capacitance is switched ON through one or various means including relays, contactors, semiconductor switching devices, and combinations thereof. Also, conventional uses of block capacitances are arranged in linear arrays. For example, for a 100 KVAR PFC rack, there are generally eight 12.5 KVAR or four 25 KVAR block capacitors, and the PFC controller is to switch ON a number of these block capacitors in linear steps, e.g. 12.5 KVAR or 25 KVAR steps. The PFC controller generally selects sufficient capacitors to drive the PF closest to 1.0 regardless of whether it will overcompensate and place leading KVAR on to the electrical network.

Historically, the utility industry was not concerned, and did not penalize users on leading KVAR overcompensation, as the electrical power distribution network tended to be lagging, or inductive, generally due to transformer, motors, fluorescent ballasts, etc. connected to it. However, with today's increasingly complex electronic loads being added on to electrical network, there is an increasing concern with leading KVAR overcompensation in the same way as with lagging KVAR, and the electrical power suppliers and distribution network operators are starting to penalize users for causing low PF, regardless of whether it is leading (capacitive) or lagging (inductive).

In the past, not only was the use of passive line PFC capacitors considered to be efficient in eliminating lagging reactive power KVAR, it was tolerable to have a minimum amount of leading reactive power KVAR or overcompensation in the electrical network. Nowadays in more and more jurisdictions, adding leading reactive power or overcompensation at any level is also being penalized as it is still lowering the PF and necessitating the generation, transmission, and delivery of additional reactive power KVAR to the KVAR load.

Traditionally, linear PFC capacitor blocks are used with compensation algorithms for calculating the required leading KVAR for compensating lagging KVAR loads to achieve a PF close to 1.0. The linear PFC capacitor blocks are switched ON based on the calculation, but typically with the only purpose of achieving a PF as close to 1.0 as possible. This is done without consideration of overcompensation. With legislations beginning to change the policies and start prohibiting overcompensating with leading KVAR, then a problem arises as the legacy use of linear PFC capacitor blocks to achieve a PF close to 1.0 with zero overcompensating leading KVAR is extremely difficult, if not impossible.

U.S. Pat. No. 9,712,048 discloses a method of passive power factor compensation using a digital PFC capacitor array. Referring to FIG. 1. Since the approach of the "Y-Axis" PF vs. the "X-Axis" KVAR is asymptotic as clearly shown in FIG. 1, PF correction can be conducted by using line PFC capacitors arranged in an addressable digital array in which the higher value PFC capacitors enable the "coarse steps" increments in the PF correction and the lower value PFC capacitors enable the "fine steps". The '048 patent further discloses that the PFC capacitors are arranged in decreasing related values; as such, the "fine steps" or small KVAR increments allow the PF to be driven and held close to 1.0 without overcompensation. In another word, minimum or zero reactive power KVAR is properly and optimally achieved in the electrical network without degrading power quality.

An ordinarily skilled person in the art may appreciate the use of a range of different capacitance value PFC capacitors arranged from large to small, which is not necessarily exactly the same as the digital array arrangement as disclosed in the '048 patent, to still achieve similar function as the aforesaid digital array. The larger PFC capacitors are switched ON as "coarse steps" and the smaller PFC capacitors as "fine steps". As such, a similar performance of PF compensation is achieved with PFC capacitor steps switching in (or activation) from "coarse steps" to "fine steps" capacitors as the PF approaches 1.0 without overcompensation.

Figure 2:
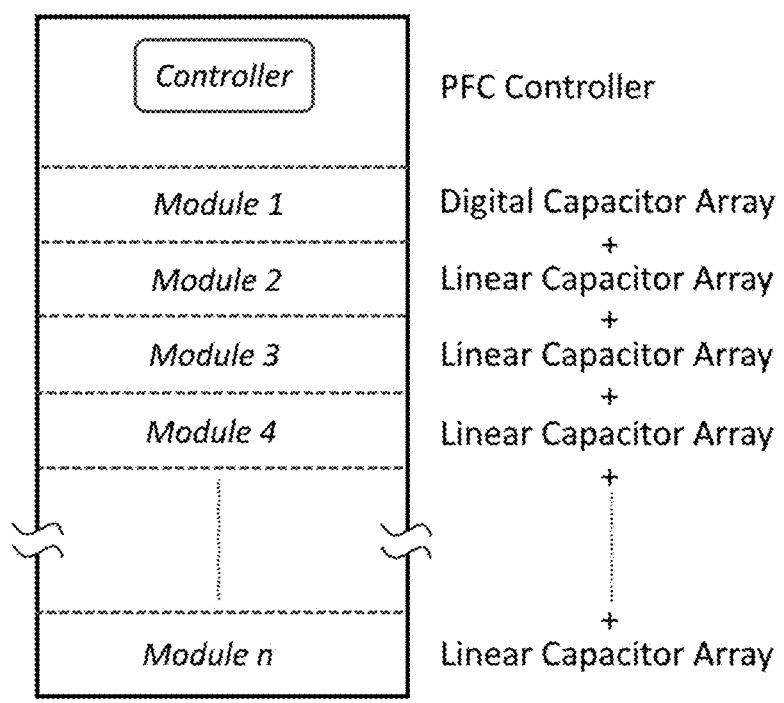
FIG. 2 illustrates a power factor correction (PFC) capacitor rack in accordance to various embodiments of the present invention.

Referring to FIG. 2. In accordance to one embodiment of the present invention, which is a major improvement over the use of legacy linear PFC capacitor blocks in the digital PFC capacitor array as disclosed in the '048 patent, provided is a PFC capacitor rack comprising a digital PFC capacitor array, e.g. one of the embodiments of the digital PFC capacitor array as disclosed in the '048 patent, one or more linear capacitor arrays, each comprising one or more linear PFC capacitors, and a PFC controller. The digital PFC capacitor array and the one or more linear capacitor arrays are arranged as modules in the PFC capacitor rack controlled by the PFC controller.

FIG. 2 shows an exemplary embodiment of the PFC capacitor rack. Module 1 is the digital PFC capacitor array, module 2 . . . n are linear capacitor arrays, and the PFC controller provides the switching control for the modules. Because module 1 relies on high speed semiconductor switching of the PFC capacitors there within, it generates and dissipates more heat as compared to the other linear capacitor array modules. The digital PFC capacitor array is also costlier than a linear capacitor array to make. However, as the PFC capacitor rack comprises many more linear capacitor array modules, the overall heat profile and cost of the PFC capacitor rack can approach that of a pure linear PFC capacitors arrangement of comparable capacity. The PFC capacitor rack as shown in FIG. 2 enables the "coarse steps" adjustments (or large KVAR increments) by using the relatively larger linear PFC capacitor array modules; and the "fine steps" adjustments (or small KVAR increments) using the digital PFC capacitor array module to drive the PF as close to 1.0 as possible without overcompensating with leading KVAR added to the electrical network.

The PFC capacitor rack in accordance to the present invention allows a total KVAR correction and even peak demand reduction with very minimal losses within the rack. In accordance to another embodiment, the PFC capacitor rack provides a three-level response to a change of load by including an active power filter (APF). The microsecond-response of an APF reacts as the first level of KVAR compensation in the event of a changing load. This APF microsecond-response ensures the compensation of transient or fast rise time KVAR. Having the APF as the first level response also reduces voltage volatility by allowing a more stable current flowing into the electrical network. Once the second level millisecond-response of the digital PFC capacitor array module kicks in, the APF transfers the compensated KVAR to the more efficient digital PFC capacitor array and lastly the linear PFC capacitor array modules. Therefore, the PFC capacitor rack modules comprise combinations of slower but more efficient linear PFC capacitor arrays, digital PFC capacitor array, and faster but less efficient APFs. This highly efficient and fast response approach is particularly beneficial to electrical network having high sensitivity on peak demand and a need of low voltage volatility.

Also, it should be well understood by an ordinarily skilled person in the art that PFC capacitors in a digital array working in combination with the additional PFC capacitors in one or more linear array do not necessary have to be in separate modules, as shown in the present exemplary embodiment shown in FIG. 2. There can be various different mechanical arrangements and packaging of the controller and PFC capacitors, including integrated single or multiple separate packaging. However, these various renditions of the PFC equipment do not in any way negate the inventiveness of or deviate from the spirit of the principal of employing PFC capacitors in a digital array working in combination with the additional PFC capacitors in one or more linear arrays all under the control of a PFC controller.

Also, to achieve very fast (within milliseconds) KVAR correction, the fast switching of each of the PFC capacitors in the capacitor arrays is controlled by one or more switching algorithms executed by one or more microcontrollers and/or processors in the PFC controller. In accordance to one embodiment, the PFC controller is packaged as one module integrated with the PFC capacitor rack. In another embodiment, the PFC controller is a standalone component separated from the PFC capacitor rack. In accordance to one embodiment, When fast switching is used, line connected high voltage AC switching semiconductors including, but not limited to, Triacs, back-to-back SCR's, SCR's in a rectifier bridge configuration, GTO's, back-to-back MOS FET's, IGBT's, and BJT's are employed for the fast switching of the PFC capacitors. It is critical that these capacitor switching semiconductors are fully protected from the very high destructive surge currents when fast-switching the PF capacitors in and out of the high AC voltage line of the electrical network.

Figure 4A:
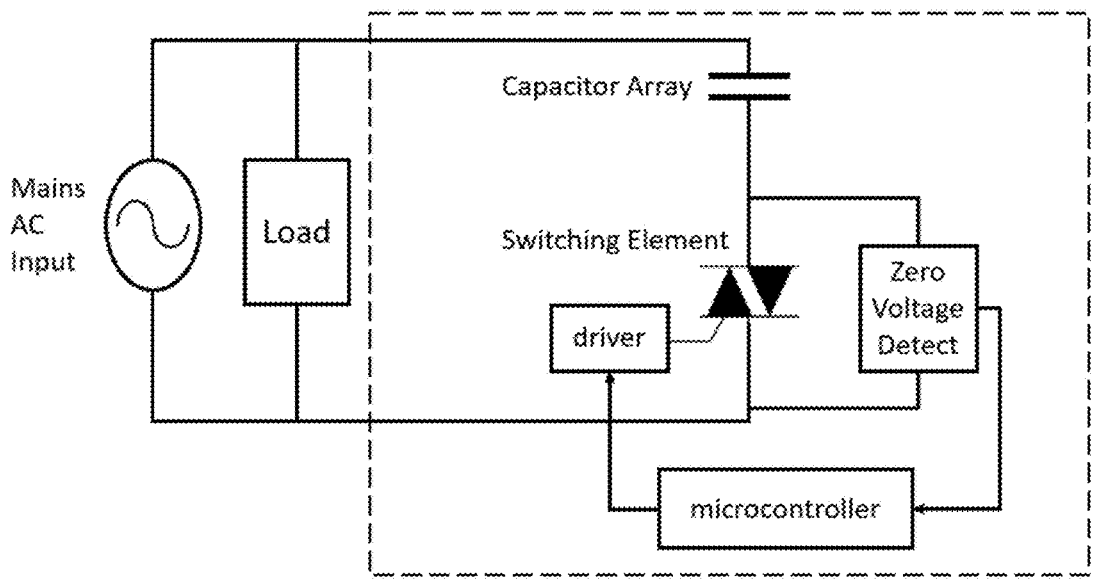
FIG. 4A depicts a block diagram illustrating the preferred method of fast semiconductor PFC capacitor switching in accordance to an embodiment of the present invention.

Referring to FIG. 4A. In accordance to a preferred embodiment, a PFC capacitor semiconductor switching method is provided, which relies upon the detection of voltage across the fast switching element. In this method, a zero-voltage detection circuitry is used to continuously track the voltage across the switching element. The information of zero-voltage detection is passed on to a microcontroller or processor, which can then generate the necessary driving signals to turn ON the switching element. For example, in a 50 Hz AC electrical network, zero-voltage detection happens every 10 milliseconds and the switching element can be switched during those times of zero-voltage detections resulting to near real-time switching. The microcontroller or processor can also be configured to learn the pattern of the zero-voltage detection by learning its frequency so it can compensate any delay in the circuitry by predicting the next zero-voltage detection and advancing or timing the driving signal to turn ON the switching element at the acceptable voltage level near absolute zero voltage.

Figure 4B:
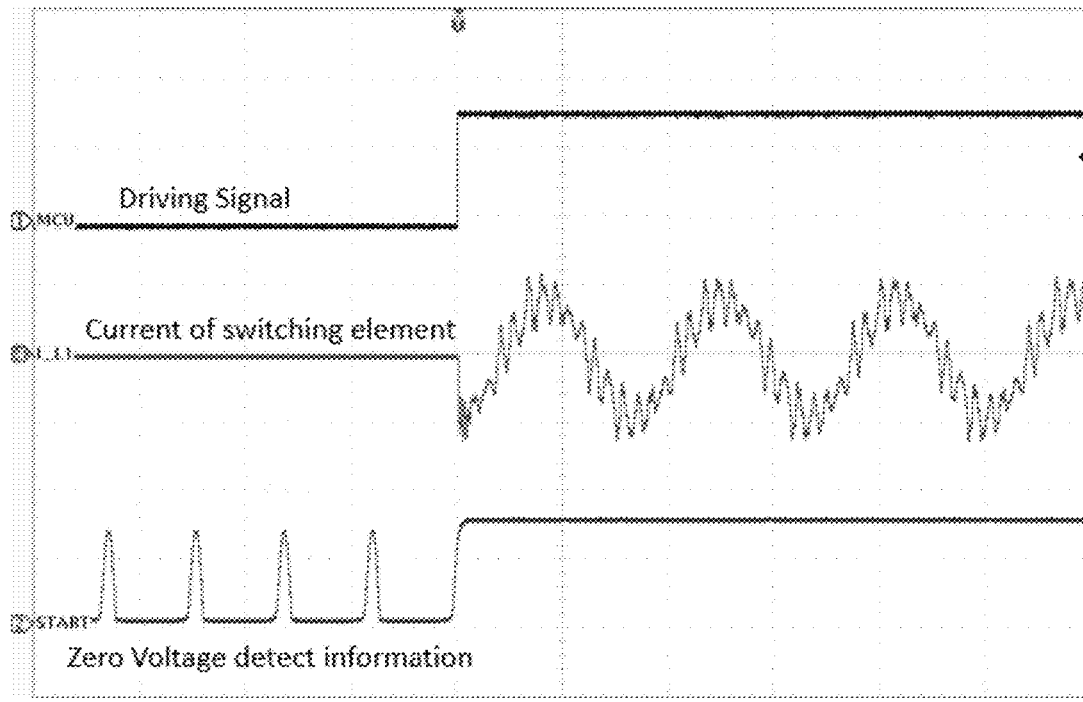
FIG. 4B shows a timing diagram of the switching method illustrated in FIG. 4A.

Furthermore, under this zero-voltage switching method, there is no inrush current produces by a PFC capacitor during its discharge state as it is switched ON at zero voltage, hence produces no differential voltage across the PFC capacitor. The switching current will result to a resistive-like load, thereby reducing the current surge stress in the switching element as shown by FIG. 4B. Referring to FIG. 4B. The zero-voltage signal (bottom waveform) is read by the PFC controller and the moment the PFC controller requires the PFC capacitor to switch ON in the fourth quadrant of the graph, the PFC controller waits for the zero-voltage detection and drives the switching element to switch at zero voltage, producing no inrush current as given by the current signal (middle waveform).

Figure 4C:
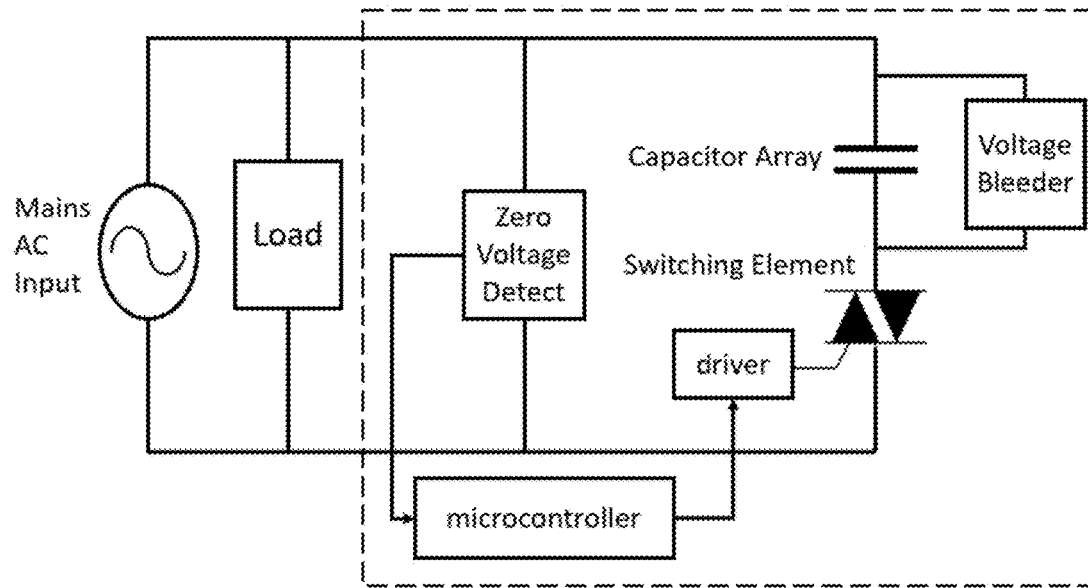
FIG. 4C depicts a block diagram illustrating an alternative method of fast semiconductor PFC capacitor switching in accordance to an embodiment of the present invention.

Referring to FIG. 4C illustrates an alternative embodiment of the PFC capacitor semiconductor switching method, which is a PFC capacitor switching method by a voltage bleeder. In this method, at zero-voltage switching the PFC capacitor is discharged for any voltage across it. For a series circuit, where the summation of voltage drop across each element is zero and when the PFC capacitor is discharged for any retained voltage, the voltage across the switching element is the same the voltage across the input. A zero-voltage detection circuitry can then be placed at the mains input. The zero-voltage detection signals are then processed by the PFC controller. Once the bleeder circuit discharges all voltage across the PFC capacitor, the PFC controller can drive the switching element to ON state once a zero-voltage detection signal is received from the zero-voltage detection circuit.

In accordance to various embodiments, the PFC capacitor rack is expandable by adding any number of module to create a large KVAR correction-capable product. Such PFC capacitor rack may have one or more, but typically one, digital PFC capacitor array modules, and a plurality of lower-cost linear PFC capacitor array modules. In one exemplary embodiment of a PFC capacitor rack of 200 KVAR correction, the PFC capacitor rack comprises four 50 KVAR correction modules with one of the modules being the digital PFC capacitor array as disclosed in the '048 patent and the rest are lower-cost linear PFC capacitor arrays. As a non-limiting example, each of the three linear PFC capacitor arrays may comprise two 25 KVAR capacitor blocks. By combining the digital PFC capacitor array with three lower-cost linear PFC capacitor arrays, the overall cost of the PFC capacitor rack is lowered than of a similar KVAR correction product using all digital PFC capacitor arrays to achieve the same performance of zero or low overcompensation. In addition, the less-heat-generating linear PFC capacitor array's higher thermal dissipation to give a heat profile of the PFC capacitor rack lower than that of a similar KVAR correction product using all digital PFC capacitor arrays. This in turn lower the component cooling requirement, and increases reliability and lifespan of the PFC capacitor rack.

In accordance to another aspect of the present invention, provided is an improvement to the use of audio or audio frequency load control (AFLC) signaling in the electrical network for status signaling and load control, such as that disclosed in U.S. patent application Ser. No. 15/555,079. In an electrical network having one or more passive capacitors for PF correction, the PFC capacitors across the line can short circuit and interrupt or suppress the audio or AFLC signals.

Figure 3:
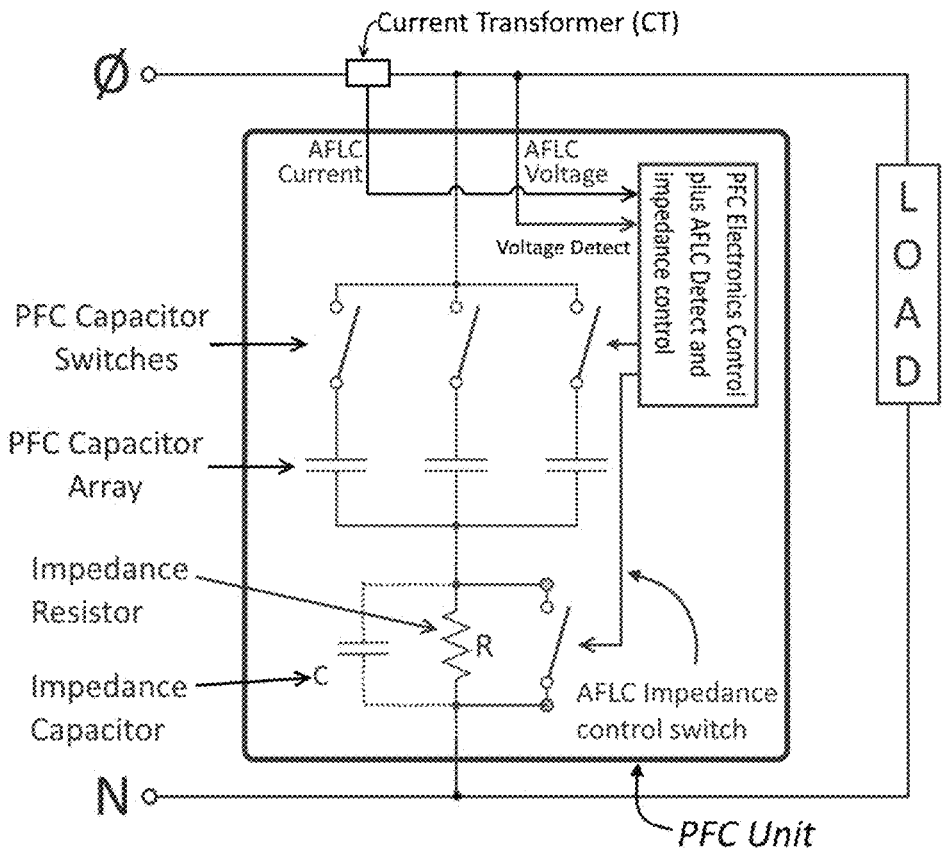
FIG. 3 depicts a block diagram illustrating the operation of PFC capacitors in an electrical network having grid audio or audio frequency load control (AFLC) signaling in accordance to various embodiments of the present invention.

Referring to FIG. 3. In accordance to various embodiments, the aforesaid PFC capacitor rack may incorporate an AFLC detection and impedance control circuitry. An AFLC current signal is taken from a current transformer on the line of the electrical network. The AFLC detection and impedance control circuitry reads and processes the AFLC current signal from the current transformer and the AFLC voltage signal on the line, and switches ON/OFF, in accordance to one embodiment, an impedance resistor. In preferred embodiment, the high heat-dissipating impedance resistor may be substituted by a low-heat dissipating capacitor, inductor, or combination thereof.

In another embodiment, the impedance component, be it comprising a resistor, capacitor, inductor, or any combination thereof, is removed completely. Its function is served instead by that the PFC capacitors being switched OFF (or disengaged) rapidly at the moment when an audio or AFLC current signal is first detected through the current transformer, and staying switched OFF throughout the entire time that the audio or AFLC voltage is present.

In yet another embodiment, when an audio or AFLC current signal is first detected through the current transformer, the presently switched-ON or engaged PFC capacitors are switched OFF one by one in rapid (e.g. in milliseconds interval) steps, until the audio or AFLC voltage being measured rises to exactly or just above a minimum level, but a sufficient level to still be within the audio or AFLC specifications, in the electrical network. For example, for standard legacy AFLC systems, the minimum voltage level acceptable by typical AFLC frequency meters is 1 Volt RMS, hence it would be appropriate to allow the engagement of a maximum amount of PFC capacitors such that the audio or AFLC voltage level is at least 1.5 Volt RMS. In yet another alternative embodiment, when an audio or AFLC current signal is first detected through the current transformer, the presently switched-ON or engaged PFC capacitors are switched OFF completely before switching back ON one by one in rapid (e.g. in milliseconds interval) steps, until the audio or AFLC voltage being measured falls to exactly or just below a minimum level, but a sufficient level to still be within the audio or AFLC specifications, in the electrical network.

Another advantage of the present invention is the efficient use of passive line PFC capacitors in PF or reactive power KVAR correction, as passive PFC capacitors dissipate very little real power KW; when they are engaged for adding a leading reactive power KVAR across an inductive load, very little real power KW is consumed. An alternate approach to correct PF or reactive power KVAR is the active approach, which is well established in the industry, and is generally referred to as utilizing an active power filter (APF). One such APF is disclosed in U.S. Pat. No. 5,321,598. Also, a typical APF topology is shown in FIG. 5A.

In general, the active approach in PF or reactive power KVAR correction uses active power semiconductor switching devices rather than passive capacitors. In addition, high speed microprocessors or digital signal processors programmed with algorithms of various methods to calculate the current needed to be injected into the electrical network are employed. In order to restore the AC current to be in phase with the voltage fundamental, current in the mains fundamental frequency (e.g. 50 or 60 Hz) is actively injected into the electrical network line to align the current waveform with the voltage waveform, hence correcting the fundamental frequency PF or minimizing the fundamental reactive power KVAR. Harmonics, which are multiples of the mains fundamental frequency, are also removed or minimized by again actively injecting currents that oppose or cancel out the voltage or current harmonics that are multiples of the mains fundamental frequency.

The major disadvantage of this active approach based on the use of APFs is the significant energy losses largely due to the operation of the power semiconductor switching devices, the double power conversion topologies, and the control and power electronics consuming large amount of power in injecting opposing current into the electrical network line to correct fundamental frequency PF and a range of harmonics. Typically, overall losses in an APF can be 3 to 5% or more depending on its design and the loadings in the electrical network. These losses are dissipated as heat.

On the other hand, in accordance to one embodiment of the present invention, the efficiency of the overall power quality function is increased by using low loss, low heat dissipation, and highly efficient passive line PFC capacitors to correct the fundamental frequency PF or KVAR in combination with a lower power APF having a specially designed or configured microcontroller, microprocessor, digital signal processor, and/or other digital or analogue means capable of processing AC current and voltage signals and generating timed electronic driving signals for generating the opposing current. This lower power APF is used only to target and eliminate or minimize the higher frequency harmonics that are multiples of the mains fundamental frequency by active power semiconductor means.

FIG. 5A illustrates a typical APF or harmonic corrector for an electrical network having a AC power source (or input) producing purely sinusoidal input current. The APF or harmonic corrector includes a current sense (e.g. a current transformer) on the electrical network line for sensing the input current and produce the necessary current composition data across the load. The sensed input current is then processed through a control loop with reference to a purely sinusoidal signal so to determine and cause an increase or decrease of an instantaneous amount of current sourced and sink by the power factor and harmonic compensator.

Figure 5B:
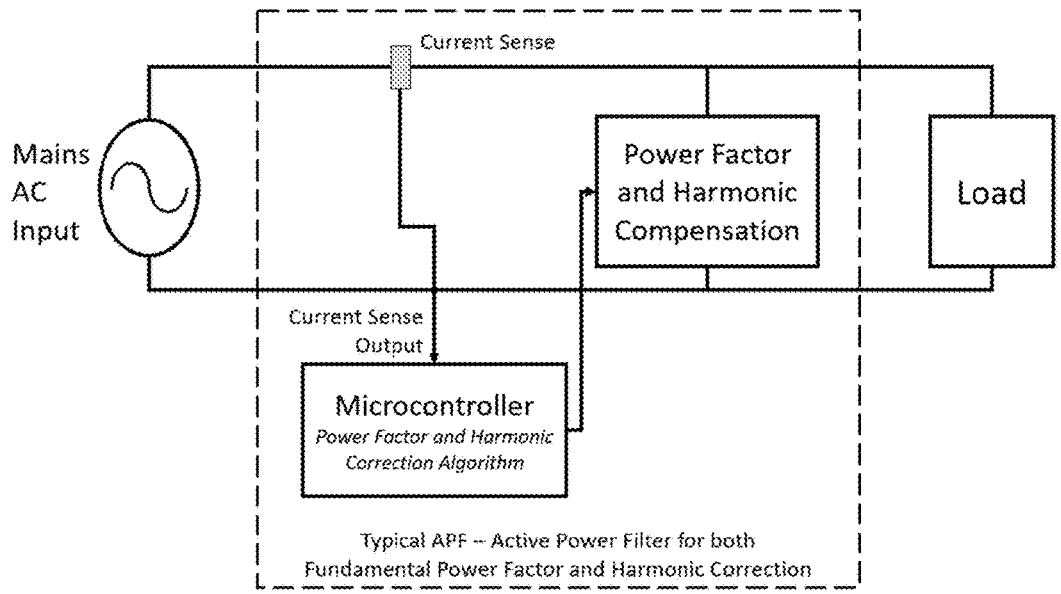
FIG. 5B depicts a block diagram of a system for correcting PF at the mains fundamental frequency and higher frequency harmonics by utilizing low power loss, low heat dissipation, and high-efficiency passive PFC capacitors in combination with a low power APF in accordance to an embodiment of the present invention.
Figure 5B:
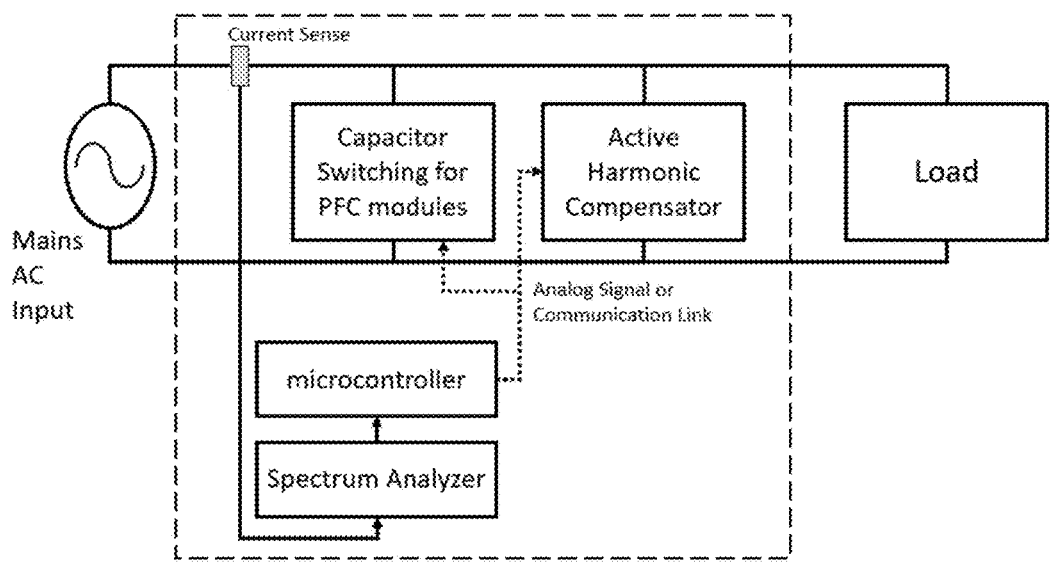
Figure 5C:
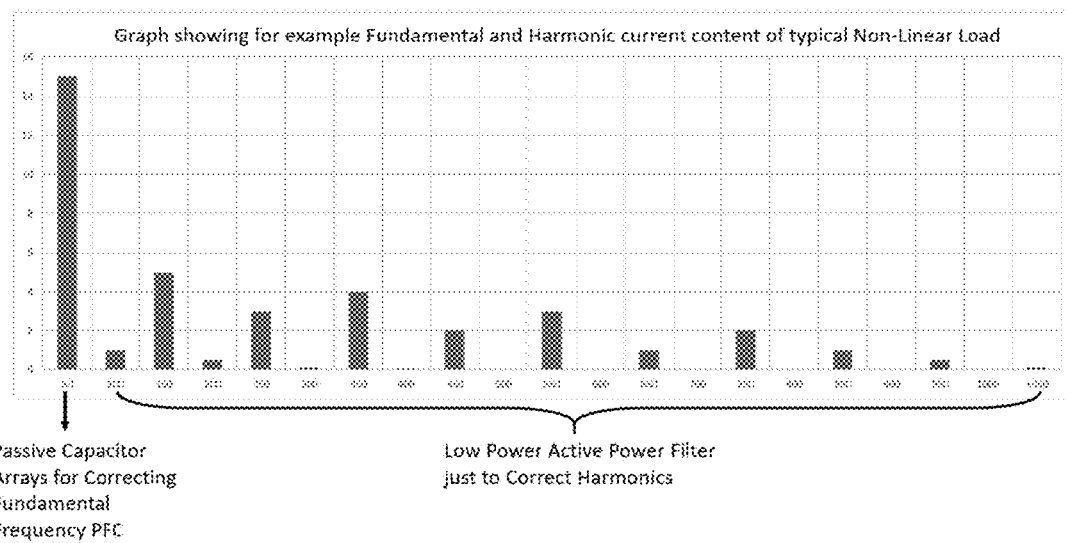
FIG. 5C shows a graph of the fundamental frequency and higher frequency harmonics current amplitudes vs. frequencies in illustration of the system depicted in FIG. 5B.

FIG. 5B illustrates an embodiment of the present invention comprising a lower power APF, which is used only to only eliminates or minimizes the harmonic contents of magnitudes that are small in relative to the fundamental frequency (e.g. 50 or 60 Hz) component; and one or more high-efficiency passive PFC capacitors, which are used only to correct the fundamental frequency (e.g. 50 or 60 Hz) KVAR or PF. For an AC electrical power distribution network having a mains fundamental frequency of 50 Hz, the higher frequency harmonic contents to be eliminated or minimized can be of i*50 Hz where i={2, 3, . . . , n}; and for an AC electrical power distribution network having a mains fundamental frequency of 60 Hz, the higher frequency harmonic contents to be eliminated or minimized can be of i*60 Hz where i={2, 3, . . . , n}.

An ordinarily skilled person in the art would appreciate that any APF topology well known in the art can be adapted to target only the higher order harmonics without deviating from the spirit and scope of the present invention, which includes the use of a lower power APF to only target and eliminate or minimize the harmonic contents of magnitudes that are small in relative to the fundamental frequency component, in combination with one or more high-efficiency passive PFC capacitors, which are used only to correct the fundamental frequency KVAR or PF.

In the situation where grid audio signaling or AFLC is used in the electrical network, the APF in accordance to the embodiments of the present invention is configured to recognize a selected specific audio or AFLC frequency. The APF in accordance to one preferred embodiment provides a user interface having a selectable menu showing a number of audio or AFLC frequencies, which may be pre-defined in a look up table preserved in a non-transient memory, and/or an electronic or electro-mechanical frequency dialer or slider for manual programming. The APF is then programmed to allow the audio or AFLC voltage signal at the selected specific audio or AFLC frequency to fully bypass the APF, and not in any way be eliminated or minimized as an undesirable harmonic.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for conducting power factor (PF) and harmonics correction in an electrical network without overcompensation, comprising:
   a controller configured:
      to receive the electrical network real-time measurement data including power factor, line voltage, line frequency, reactive power, and sign of reactive power;
      to determine a compensation capacitance required to correct the PF; and
      to generate one or more driving signals for switching ON and OFF one or more PFC capacitors according to the determined compensation capacitance required;
   a digital PFC capacitor array comprising two or more passive PFC capacitors and configured to receive the driving signals for switching ON and OFF any one of its passive PFC capacitors, providing fine steps increments in the PF correction, wherein the digital PFC capacitor array passive PFC capacitors are of different capacitance values and are arranged in largest to smallest or smallest to largest order; and
   one or more linear PFC capacitor arrays, each comprising one or more passive PFC capacitors and configured to receive the driving signals for switching ON and OFF its passive PFC capacitors, providing coarse steps increments in the PF correction, wherein each of the linear PFC capacitor arrays has a capacitance that is same or larger than the largest digital PFC capacitor array passive PFC capacitor's capacitance.

2. The system of claim 1, further comprising an active power filter (APF) configured to only target and eliminate or minimize harmonics in the electrical network;
   wherein the digital PFC capacitor array and the linear PFC capacitor arrays are configured to correct the PF at fundamental frequency.

3. The system of claim 2,
wherein the APF comprises a mean for specifying an audio or audio frequency load control (AFLC) frequency; and
wherein the APF is further configured to allow the specified audio or AFLC frequency to bypass the APF.

4. The system of claim 1, wherein the controller is further configured:
to receive voltage detection readings across the passive PFC capacitor switching elements in the digital PFC capacitor array and the linear PFC capacitor arrays; and
to generate timed driving signals for driving the passive PFC capacitor switching elements such that the corresponding passive PFC capacitors are switched ON at zero voltage detection readings across the passive PFC capacitor switching elements.

5. The system of claim 1, wherein the controller is further configured:
to receive zero-voltage detections across each of the passive PFC capacitor switching elements in the digital PFC capacitor array and the linear PFC capacitor arrays; and
to generate timed driving signals for driving the passive PFC capacitor switching elements such that the corresponding passive PFC capacitors are switched ON at zero voltage across the passive PFC capacitor switching elements.

6. The system of claim 1, further comprising voltage bleeder circuits, each connected in parallel with one of the passive PFC capacitors and is configured to discharge any retained voltage of the corresponding passive PFC capacitor;
wherein the controller is further configured:
to receive zero-voltage detections across the system; and
to generate driving signals for driving the passive PFC capacitor switching elements such that the corresponding passive PFC capacitors are switched ON at zero voltage across the system once the voltage bleeder circuits discharge all retained voltage of the corresponding passive PFC capacitors.

7. The system of claim 1, wherein the controller is further configured:
to receive an audio or audio frequency load control (AFLC) current signal; and
to generate the driving signals for switching OFF all the passive PFC capacitors when the audio or AFLC current signal indicated an audio or AFLC voltage is present in the electrical network.

8. The system of claim 1, wherein the controller is further configured:
to receive an audio or audio frequency load control (AFLC) current signal; and
to generate timed driving signals for switching OFF one by one in steps the engaged passive PFC capacitors until an audio or AFLC voltage being measured rises to exactly or just above a minimum level when the audio or AFLC current signal indicated an audio or AFLC voltage is present in the electrical network.

9. The system of claim 1, wherein the controller is further configured:
to receive an audio or audio frequency load control (AFLC) current signal; and
to generate the driving signals for initially switching OFF all the engaged passive PFC capacitors followed by the timed driving signals for switching ON one by one in steps the passive PFC capacitors until an audio or AFLC voltage being measured falls to exactly or just below a minimum level when the audio or AFLC current signal indicated an audio or AFLC voltage is present in the electrical network.

10. A method for conducting power factor (PF) and harmonics correction in an electrical network without overcompensation, comprising:
obtaining the electrical network real-time measurement data including power factor, line voltage, line frequency, reactive power, and sign of reactive power;
determining a compensation capacitance required to correct the PF; and
generating one or more driving signals for switching ON and OFF one or more PFC capacitors according to the determined compensation capacitance required;
providing a digital PFC capacitor array comprising two or more passive PFC capacitors and configured to receive the driving signals for switching ON and OFF any one of its passive PFC capacitors, providing fine steps increments in the PF correction, wherein the digital PFC capacitor array passive PFC capacitors are of different capacitance values and are arranged in largest to smallest or smallest to largest order; and
providing one or more linear PFC capacitor arrays, each comprising one or more passive PFC capacitors and configured to receive the driving signals for switching ON and OFF its passive PFC capacitors, providing coarse steps increments in the PF correction, wherein each of the linear PFC capacitor arrays has a capacitance that is same or larger than the largest digital PFC capacitor array passive PFC capacitor's capacitance.

11. The method of claim 10, further comprising providing an active power filter (APF) configured to only target and eliminate or minimize harmonics in the electrical network;
wherein the digital PFC capacitor array and the linear PFC capacitor arrays are configured to correct the PF at fundamental frequency.

12. The method of claim 11,
wherein the APF comprises a mean for specifying an audio or audio frequency load control (AFLC) frequency; and
wherein the APF is further configured to allow the specified audio or AFLC frequency to bypass the APF.

13. The method of claim 10, further comprising:
obtaining voltage detection readings across the passive PFC capacitor switching elements in the digital PFC capacitor array and the linear PFC capacitor arrays; and
generating timed driving signals for driving the passive PFC capacitor switching elements such that the corresponding passive PFC capacitors are switched ON at zero voltage detection readings across the passive PFC capacitor switching elements.

14. The method of claim 10, further comprising:
obtaining zero-voltage detections across each of the passive PFC capacitor switching elements in the digital PFC capacitor array and the linear PFC capacitor arrays; and
generating timed driving signals for driving the passive PFC capacitor switching elements such that the corresponding passive PFC capacitors are switched ON at zero voltage across the passive PFC capacitor switching elements.

15. The method of claim 10, further comprising:
providing voltage bleeder circuits, each connected in parallel with one of the passive PFC capacitors and is configured to discharge any retained voltage of the corresponding passive PFC capacitor;

obtaining zero-voltage detections across the PFC capacitor arrays; and generating driving signals for driving the passive PFC capacitor switching elements such that the corresponding passive PFC capacitors are switched ON at zero voltage across the PFC capacitor arrays once the voltage bleeder circuits discharge all retained voltage of the corresponding passive PFC capacitors.

16. The method of claim 10, further comprising:

receiving an audio or audio frequency load control (AFLC) current signal from the electrical network line; and generating the driving signals for switching OFF all the passive PFC capacitors when the audio or AFLC current signal indicated an audio or AFLC voltage is present in the electrical network.

17. The method of claim 1, further comprising:

receiving an audio or audio frequency load control (AFLC) current signal from the electrical network line; and generating timed driving signals for switching OFF one by one in steps the engaged passive PFC capacitors until an audio or AFLC voltage being measured rises to exactly or just above a minimum level when the audio or AFLC current signal indicated an audio or AFLC voltage is present in the electrical network.

18. The method of claim 1, further comprising:

receiving an audio or audio frequency load control (AFLC) current signal from the electrical network line; and generating the driving signals for initially switching OFF all the engaged passive PFC capacitors followed by the timed driving signals for switching ON one by one in steps the passive PFC capacitors until an audio or AFLC voltage being measured falls to exactly or just below a minimum level when the audio or AFLC current signal indicated an audio or AFLC voltage is present in the electrical network.

* * * * *